US012692841B2

(12) United States Patent
Palacios Burgos et al.

(10) Patent No.: US 12,692,841 B2
(45) Date of Patent: Jul. 28, 2026

(54) SYSTEM FOR HANDLING A NACELLE OF A WIND TURBINE AND RELATED METHODS

(71) Applicant: NORDEX ENERGY SPAIN, S.A.U., Navarra (ES)

(72) Inventors: Luis Palacios Burgos, Navarra (ES); Unai Arraztoa Magaña, Navarra (ES); Idoia Aboitiz Garroguerricaechebarria, Bilbao (ES); Iñaki Gonzalez Lahera, Bilbao (ES)

(73) Assignee: NORDEX ENERGY SPAIN, S.A.U., Navarra (ES)

( * ) Notice: Subject to any disclaimer, the term of this patent is extended or adjusted under 35 U.S.C. 154(b) by 229 days.

(21) Appl. No.: 18/723,149

(22) PCT Filed: Dec. 1, 2022

(86) PCT No.: PCT/EP2022/083967
§ 371 (c)(1),
(2) Date: Jun. 21, 2024

(87) PCT Pub. No.: WO2023/117352
PCT Pub. Date: Jun. 29, 2023

(65) Prior Publication Data
US 2025/0059954 A1     Feb. 20, 2025

(30) Foreign Application Priority Data
Dec. 22, 2021     (EP) ..................................... 21383200

(51) Int. Cl.
*F03D 13/40* (2016.01)
*B60P 1/02* (2006.01)

(52) U.S. Cl.
CPC .............. *F03D 13/403* (2023.08); *B60P 1/02* (2013.01); *F05B 2260/02* (2013.01)

(58) Field of Classification Search
CPC ....... F03D 13/403; B60P 1/02; F05B 2260/02
USPC ........................................ 415/213.1; 414/800
See application file for complete search history.

(56) References Cited

U.S. PATENT DOCUMENTS

| | | | | |
|---|---|---|---|---|
| 4,053,062 A | * | 10/1977 | Travis | .................. B23P 19/024 |
| | | | | 29/726.5 |
| 4,412,774 A | * | 11/1983 | Legrand | .................... B64F 5/50 |
| | | | | 244/54 |
| 8,083,471 B2 | * | 12/2011 | Black | ...................... F01D 25/28 |
| | | | | 415/213.1 |
| 8,276,860 B2 | * | 10/2012 | Ye | ............................. G06F 1/20 |
| | | | | 415/126 |

(Continued)

FOREIGN PATENT DOCUMENTS

| | | |
|---|---|---|
| CN | 110529344 A | 12/2019 |
| EP | 2395240 A1 | 12/2011 |
| EP | 3904675 A1 | 11/2021 |

*Primary Examiner* — Terrell L Mckinnon
*Assistant Examiner* — Michael McDuffie
(74) *Attorney, Agent, or Firm* — Hayes Soloway PC

(57) ABSTRACT

A system for handling a nacelle of a wind turbine for instance for the purpose of transporting the nacelle to or from a site of installation of the wind turbine, reduces the loading and/or unloading time and provides a more flexible planning for the nacelle transportation, and also relates to a method for loading a nacelle of a wind turbine on a transportation base and a method for unloading a nacelle of a wind turbine from a transportation base.

15 Claims, 12 Drawing Sheets

(56) References Cited

U.S. PATENT DOCUMENTS

| | | | | |
|---|---|---|---|---|
| 8,616,517 | B2 * | 12/2013 | Huth | F04D 29/605 |
| | | | | 248/677 |
| 2011/0299968 | A1 | 12/2011 | Poulesen et al. | |
| 2013/0189067 | A1 * | 7/2013 | Notohardjono | H05K 7/1488 |
| | | | | 108/51.11 |
| 2013/0236304 | A1 | 9/2013 | Moestrup | |
| 2014/0023474 | A1 * | 1/2014 | Willim | B66C 23/62 |
| | | | | 414/800 |
| 2014/0188749 | A1 * | 7/2014 | Lanigan, Sr. | B65G 63/004 |
| | | | | 414/800 |
| 2015/0226265 | A1 * | 8/2015 | Bourgeois | B66C 1/62 |
| | | | | 29/259 |
| 2016/0161049 | A1 * | 6/2016 | Davi | F01D 25/28 |
| | | | | 414/800 |
| 2016/0194041 | A1 * | 7/2016 | Smith | B62D 57/02 |
| | | | | 414/800 |
| 2023/0258159 | A1 * | 8/2023 | Poisler | B60P 3/40 |
| | | | | 410/44 |

* cited by examiner

SYSTEM FOR HANDLING A NACELLE OF A WIND TURBINE AND RELATED METHODS

CROSS-REFERENCE TO RELATED APPLICATIONS AND PRIORITY

This patent application claims priority from International Patent Application No. PCT/EP2022/083967 filed Dec. 1, 2022, which claims priority from European Patent Application No. 21383200.9 filed Dec. 22, 2021.

OBJECT OF THE INVENTION

The present invention relates to a system for handling a nacelle of a wind turbine for instance for the purpose of transporting the nacelle to or from a site of installation of the wind turbine, wherein the system reduces the loading and/or unloading time and provides a more flexible planning for the nacelle transportation.

The invention also relates to a method for loading a nacelle of a wind turbine on a transportation means and a method for unloading a nacelle of a wind turbine from a transportation means.

BACKGROUND OF THE INVENTION

When large nacelles of wind turbines are to be shipped, a large crane is needed to move and lift each nacelle to a vehicle to further transport each nacelle to the site for erection of the wind turbines or to transport each nacelle to a ship or a train for further transportation or just to store the nacelle before a further transportation.

However, a large crane used both for loading or unloading a nacelle to or from a vehicle for transportation is typically very expensive and slow when many nacelles are to be shipped. Further, when the crane is only a fixed portal crane there may be not enough space available below the crane for all the nacelles to be stored and to be shipped.

Therefore, alternative methods for loading or unloading a nacelle to or from a vehicle for transportation without using a crane have been developed.

It is known in the state of the art the handling systems for a nacelle of a wind turbine comprising two or more lifting means for displacing the nacelle substantially in a vertical direction during self-loading or self-unloading of the nacelle.

It is also known the transport systems for a wind turbine nacelle comprising a base structure having a first and a second side and being adapted for supporting and connecting with the large element to be transported such a nacelle, provided with supporting elements and connecting means for fastening the nacelle of the wind turbine, and a transport method for a nacelle.

Still, there is a need for improving the handling of a wind turbine nacelle in terms of simplification of operations, in particular for transportation purposes.

The system for handling a nacelle of a wind turbine and the related method of the present invention aims to solve most of the aforementioned problems.

DESCRIPTION OF THE INVENTION

The present invention relates to a system for handling a nacelle of a wind turbine for instance for the purpose of transporting the nacelle to or from a site of installation of the wind turbine, wherein the system reduces the loading and/or unloading time and provides a more flexible planning for the nacelle transportation since the components of the system (described below) such as the transportation means and the frames are non-bulky and the crossbeams can be decoupled from the system, thus simplifying the handling and the loading and unloading, in addition to the cost savings of not having to use a crane.

The system comprises a longitudinal direction and a transversal direction;

wherein the nacelle comprises a nacelle frame being adapted to rest, by means of a first transport frame, on a transportation means;

wherein the nacelle frame comprises a first width defined in the transversal direction, a main support frame and a generator frame;

wherein the transportation means comprises a second width defined in the transversal direction and a loading platform; and wherein the system comprises:

the first transport frame configured to be connected to the main support frame of the nacelle frame and configured to rest on the transportation means;

at least one first crossbeam disposed in the transversal direction of the system and comprising:

a first length defined in the transversal direction of the system;

an upper surface, wherein the first transport frame is configured to be supported on the upper surface of the at least one first crossbeam during at least a loading or unloading operation of the nacelle on the transportation means;

a first end and a second end, each one of the first end and the second end comprising a lower surface;

wherein the first length of the at least one first crossbeam is bigger than the second width of the transportation means;

at least two first lateral supports configured to be disposed on a ground separated by a first distance defined in the transversal direction of the system, wherein the first distance is bigger than the second width of the transportation means and smaller than the first length of the at least one first crossbeam, the at least two first lateral supports also configured to support the at least one first crossbeam, the first transport frame and the nacelle, such that the lower surface of the first end and the second end of the at least one first crossbeam rests on the at least two first lateral supports during at least a loading or unloading operation of the nacelle on the transportation means.

The system so configured allows that when the nacelle is to be moved or transported, the loading platform of the transportation means, that may be in particular a truck or trailer, is positioned beneath the nacelle coupled to the first transport frame. Then, the loading platform of the transportation means may be raised such that both the nacelle, the at least one first crossbeam and the first transport frame are lifted. In this situation, the at least one cross beam is capable of support at least the weight of the nacelle, and preferably the weight of the nacelle and the drive train of the nacelle. The raising of the loading platform of the transportation means may be done by hydraulics, by pneumatics, mechanically, electrically and/or by any kind of actuator installed on the transportation means. Once the nacelle is resting on the transport platform by means of the first transport frame, the at least one first crossbeam may be released. Afterwards, the nacelle is driven away by the transportation means.

Optionally, the at least one first crossbeam is an independent and decoupling part from the first transport frame. In this way, the at least one first crossbeam can be disconnected from the first transport frame while performing the operations above described with the nacelle already resting on the first transport frame.

Optionally, the first transport frame may be locked on the transportation means.

Preferably, the main support frame is a yaw bearing connection frame.

Optionally, the first transport frame comprises at least two coupling openings disposed in opposite sides of the first transport frame in the transversal direction, and wherein the at least one first crossbeam is configured to be coupled to or decoupled from the first transport frame by means of the at least two coupling openings.

Preferably, the first transport frame comprises a connection flange configured to be connected to the main support frame of the nacelle frame. Also preferably, the at least two coupling openings of the first transport frame are disposed in a vertical projection of the connection flange of the first transport frame.

In this way, the at least one first crossbeam can be coupled to the first transport frame before or after the connection flange of the first transport frame is connected to the main support frame of the nacelle frame.

Optionally, the system comprises two first crossbeams, wherein, preferably, the two first crossbeams are disposed in a symmetrical way with regard to an axis of symmetry which passes by a centre of the first transport frame in the transversal direction. In this way, the weight of the nacelle is more efficiently-distributed between the two first crossbeams.

Optionally, the system further comprises:

a second transport frame configured to be connected to the generator frame of the nacelle frame and configured to rest on the transportation means;

at least one second crossbeam disposed in the transversal direction and comprising:

a second length defined in the transversal direction of the system;

an upper surface, wherein the second transport frame is configured to be supported on the upper surface of the at least one second crossbeam during at least a loading or unloading operation of the nacelle on the transportation means;

a first end and a second end, each one of the first end and the second end comprising a lower surface;

wherein the second length of the at least one second crossbeam is bigger than the second width of the transportation means;

at least two second lateral supports configured to be disposed on the ground separated by a second distance defined in the transversal direction of the system, wherein the second distance is bigger than the second width of the transportation means and smaller than the second length of the at least one second crossbeam, the at least two first lateral supports also configured to support the at least one second crossbeam, the second transport frame and the nacelle, such that the lower surface of the first end and the second end of the at least one second crossbeam rests on the at least two second lateral supports during at least a loading or unloading operation of the nacelle on the transportation means.

The system so configured allows using different nacelles wherein the presence of the second transport frame is more recommended.

Optionally, the second transport frame comprises a through-hole disposed in the transversal direction and wherein the at least one second crossbeam is configured to be coupled to the second transport frame by means of the through-hole.

Optionally, the system further comprises an intermediate element comprising a through-hole disposed in the transversal direction and wherein the at least one second crossbeam is configured to be coupled. Preferably, the intermediate element is disposed on the second transport frame.

Optionally, the second transport frame comprises at least two support units configured to be connected to the generator frame of the nacelle frame In this way, the at least one second crossbeam can be coupled to the second transport frame before or after the at least two support units of the second transport frame are connected to the generator frame of the nacelle frame.

The lower surface of the first end and the second end of the at least one first crossbeam rests on the at least two first lateral supports without any locking between the at least one first crossbeam and the at least two first lateral supports.

The lower surface of the first end and the second end of the at least one second crossbeam rests on the at least two second lateral supports without any locking between the at least one second crossbeam and the at least two second lateral supports.

Optionally, the system comprises at least two third lateral supports configured to be disposed on the ground separated by a third distance defined in the transversal direction of the system, wherein the third distance is bigger than the second width of the transportation means and smaller than the first length of the at least one first crossbeam, the at least two third lateral supports also configured to support the first transport frame and the nacelle during at least a loading or unloading operation of the nacelle on the transportation means, such that the at least two third lateral supports comprise an upper surface disposed at a greater height than the upper surface of the at least one first crossbeam when the lower surface of the first end and the second end of the at least one first crossbeam rests on the at least two first lateral supports during at least a loading or unloading operation of the nacelle on the transportation means.

The system so configured allows that when the nacelle is to be loaded, the loading platform of the transportation means, that may be in particular a truck or trailer, may be positioned beneath the nacelle coupled to at least the first transport frame to lift both the nacelle, the at least first transport frame and the at least one first crossbeam. Once the at least two third lateral supports are disposed on the ground beneath the first transport frame at both sides of the loading platform in the transversal direction, the loading platform of the transportation means may be taken down such that both the nacelle and the first transport frame rest on the at least two third lateral supports, making possible to release the at least one first crossbeam while the nacelle and the first transport frame rest on the at least two third lateral supports.

The invention also relates to a method for loading a nacelle of a wind turbine on a transportation means, the method carried out with the system described above, wherein the method comprises the following steps:

a step of positioning the loading platform of the transportation means under the first transport frame and the nacelle and optionally under the at least one first crossbeam, in between the at least two first lateral supports wherein the lower surfaces of the first end and the second end of the at least one first crossbeam are configured to rest; and a step of raising the loading platform of the transportation means such that the at least one first crossbeam ceases to rest on the at least two first lateral supports, and the at least one first crossbeam, the first transport frame and the nacelle rest on the loading platform.

This method allows a very flexible and low-cost transportation of the nacelle since the two first lateral supports can be used with many kinds of nacelles without adaption, as the nacelle rests, by means of the at least one first transport frame and the at least one first crossbeam.

Optionally, the method for loading a nacelle of a wind turbine on a transportation means further comprises:

a step of coupling the at least one first crossbeam to the first transport frame by means of the at least two coupling openings of the first transport frame before the step of positioning the loading platform of the transportation means under the first transport frame and the nacelle and optionally under the at least one first crossbeam, in between the at least two first lateral supports.

Optionally, the method for loading a nacelle of a wind turbine on a transportation means further comprises:

a step of coupling the at least one first crossbeam to the first transport frame by means of the at least two coupling openings of the first transport frame after the step of positioning the loading platform of the transportation means under the first transport frame and the nacelle and optionally under the at least one first crossbeam, in between the at least two first lateral supports.

Optionally, the method for loading a nacelle of a wind turbine on a transportation means further comprises:

a step of disposing the at least one first crossbeam below the first transport frame before the step of positioning the loading platform of the transportation means under the first transport frame and the nacelle and optionally under the at least one first crossbeam, in between the at least two first lateral supports.

Optionally, the method for loading a nacelle of a wind turbine on a transportation means further comprises:

a step of disposing the at least one first crossbeam below the first transport frame after the step of positioning the loading platform of the transportation means under the first transport frame and the nacelle and optionally under the at least one first crossbeam, in between the at least two first lateral supports.

Optionally, the method further comprises:

a step of connecting the connection flange of the first transport frame to the main support frame of the nacelle frame.

When the method for loading a nacelle of a wind turbine on a transportation means is carried out with the system comprising the second transport frame, the at least one second crossbeam and the at least two second lateral supports, the method further comprises:

a step of positioning the loading platform of the transportation means under the second transport frame and the nacelle and optionally under the at least one second crossbeam, in between the at least two second lateral supports wherein the lower surfaces of the first end and the second end of the at least one second crossbeam are configured to rest;

such that in the step of raising the loading platform of the transportation means, the at least one second crossbeam also ceases to rest on the at least two second lateral supports, and the at least one second crossbeam, the second transport frame and the nacelle rest on the loading platform.

When the method for loading a nacelle of a wind turbine on a transportation means is carried out with the system comprising the at least two third lateral supports, the method further comprises:

a step of positioning one third lateral support of the at least two third lateral supports on the ground at each side of the transportation means and under the first transport frame;

a step of taking down the loading platform of the transportation means such that the first transport frame rests on the at least two third lateral supports, supporting the first transport frame and the nacelle;

a step of removing the at least one first crossbeam; and a step of raising the loading platform of the transportation means such that the first transport frame ceases to rest on the at least two third lateral supports, and the first transport frame and the nacelle rest on the loading platform.

Optionally, the step of removing the at least one first crossbeam is carried out decoupling the at least one first crossbeam from the first transport frame.

Optionally, the step of removing the at least one first crossbeam is carried out removing the at least one first crossbeam from below the first transport frame.

The invention also relates to a method for unloading a nacelle of a wind turbine from a transportation means, the method carried out with the system described above, wherein the method comprises the following steps:

a step of positioning the loading platform of the transportation means carrying the first transport frame and the nacelle, and optionally the at least one first crossbeam, in between the at least two first lateral supports; and a step of taking down the loading platform of the transportation means such that the lower surface of the first end and the second end of the at least one first crossbeam rests on the at least two first lateral supports, supporting the at least one first crossbeam, the first transport frame and the nacelle.

In this way, the nacelle's unloading operation does not involve the use of auxiliary equipment and it is independent of the cranes. This provides a more flexible planning for the nacelle transportation to the wind farm, reduces the unloading time and improves the mounting cycle in monetary terms.

Optionally, when the method for unloading a nacelle of a wind turbine from a transportation means is carried out with the system comprising the second transport frame, the at least one second crossbeam and the at least two second lateral supports, the method further comprises:

in the step of positioning the loading platform of the transportation means carrying the first transport frame and the nacelle and optionally the at least one first crossbeam, in between the at least two first lateral supports, the at least one second crossbeam and the second transport frame are also disposed on the loading platform; and in the step of taking down the loading platform of the transportation means, the lower surface of the first end and the second end of the at least one second crossbeam rests on the at least two second lateral supports, such that the second lateral supports support the at least one second crossbeam, the second transport frame and the nacelle.

PREFERRED EMBODIMENT OF THE INVENTION

Figure 1:
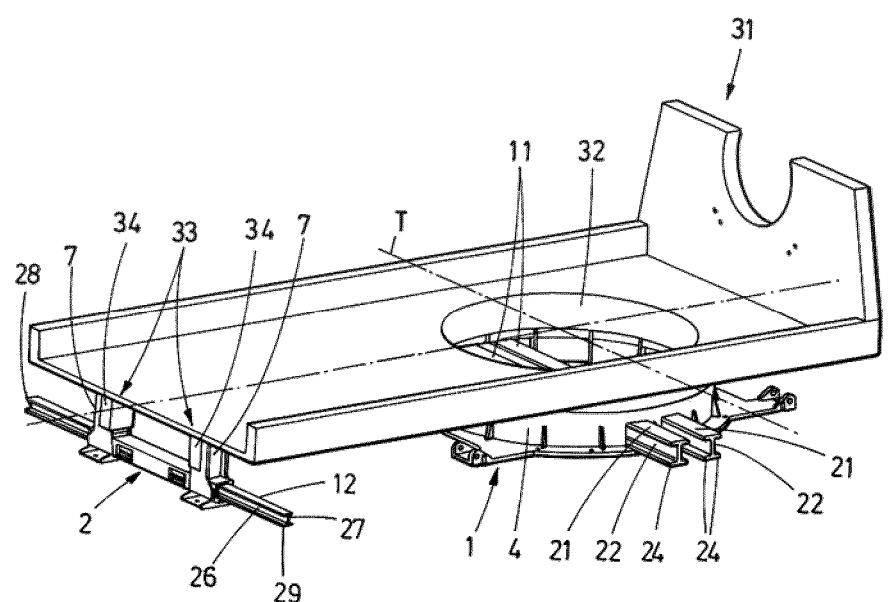
FIG. 1 shows a perspective view of the nacelle frame disposed on the first transport frame and the second transport frame, wherein the at least one first crossbeam and the at least one second crossbeam are configured to be coupled and decoupled, respectively from the first transport frame and the second transport frame, belonging to the system for handling a nacelle of a wind turbine of the present invention according to a first preferred embodiment.

A detailed description of the system for handling a nacelle of a wind turbine and the related methods of the present invention is now described, according to FIGS. 1 to 26 referred above.

The system for handling a nacelle of a wind turbine comprises a longitudinal direction and a transversal direction (T);

wherein the nacelle (30) comprises a nacelle frame (31) being adapted to rest, by means of a first transport frame (1), on a transportation means (40);

wherein the nacelle frame (31) comprises a first width (W1) defined in the transversal direction (T), a main support frame (32) and a generator frame (33);

wherein the transportation means (40) comprises a second width (W2) defined in the transversal direction (T) and a loading platform (41); and wherein the system comprises:

the first transport frame (1) configured to be connected to the main support frame (32) of the nacelle frame (31) and configured to rest on the transportation means (40);

at least one first crossbeam (11) disposed in the transversal direction (T) of the system and comprising:

a first length (L1) defined in the transversal direction of the system;

an upper surface (21), wherein the first transport frame (1) is configured to be supported on the upper surface (21) of the at least one first crossbeam (11) during at least a loading or unloading operation of the nacelle on the transportation means (40);

a first end (22) and a second end (23), each one of the first end (22) and the second end (23) comprising a lower surface (24);

wherein the first length (L1) of the at least one first crossbeam (11) is bigger than the second width (W2) of the transportation means (40);

at least two first lateral supports (101) configured to be disposed on a ground (G) separated by a first distance (D1) defined in the transversal direction (T) of the system, wherein the first distance (D1) is bigger than the second width (W2) of the transportation means (40) and smaller than the first length (L1) of the at least one first crossbeam (11), the at least two first lateral supports (101) also configured to support the at least one first crossbeam (11), the first transport frame (1) and the nacelle (30), such that the lower surface (24) of the first end (22) and the second end (23) of the at least one first crossbeam (11) rests on the at least two first lateral supports (101) during at least a loading or unloading operation of the nacelle on the transportation means (40).

Optionally, the system further comprises:

a second transport frame (2) configured to be connected to the generator frame (33) of the nacelle frame (31) and configured to rest on the transportation means (40);

at least one second crossbeam (12) disposed in the transversal direction (T) and comprising:

a second length (L2) defined in the transversal direction of the system;

an upper surface (26), wherein the second transport frame (2) is configured to be supported on the upper surface (26) of the at least one second crossbeam (12) during at least a loading or unloading operation of the nacelle on the transportation means (40);

a first end (27) and a second end (28), each one of the first end (27) and the second end (28) comprising a lower surface (29);

wherein the second length (L2) of the at least one second crossbeam (12) is bigger than the second width (W2) of the transportation means (40);

at least two second lateral supports (102) configured to be disposed on the ground (G) separated by a second distance (D2) defined in the transversal direction (T) of the system, wherein the second distance (D2) is bigger than the second width (W2) of the transportation means (40) and smaller than the second length (L2) of the at least one second crossbeam (12), the at least two first lateral supports (102) also configured to support the at least one second crossbeam (12), the second transport frame (2) and the nacelle (30), such that the lower surface (29) of the first end (27) and the second end (28) of the at least one second crossbeam (12) rests on the at least two second lateral supports (102) during at least a loading or unloading operation of the nacelle on the transportation means (40).

In a first preferred embodiment shown in FIGS. 1 to 3 and 5, the first transport frame (1) comprises at least two coupling openings (3) disposed in opposite sides of the first transport frame (1) in the transversal direction (T), and wherein the at least one first crossbeam (11) is configured to be coupled to or decoupled from the first transport frame (1) by means of the at least two coupling openings (3).

The first transport frame (1) comprises a connection flange (4) configured to be connected to the main support frame (32) of the nacelle frame (31). Preferably, the at least two coupling openings (3) of the first transport frame (1) are disposed in a vertical projection of the connection flange (4) of the first transport frame (1).

Preferably, the system comprises two first crossbeams (11) and the first transport frame (1) comprises four coupling openings (3) disposed, two by two, in opposite sides of the first transport frame (1) in the transversal direction (T), and wherein the two first crossbeams (11) are configured to be coupled to the first transport frame (1) in the transversal direction (T) by means of the four coupling openings (3) disposed, two by two, in opposite sides of the first transport frame (1) in the transversal direction (T).

Preferably, the two first crossbeams (11) are disposed in a symmetrical way with regard to an axis of symmetry which passes by a centre of the first transport frame (1) in the transversal direction (T), as shown in FIG. 1.

In this first preferred embodiment, the second transport frame (2), shown in FIGS. 1-2 and 4-5 comprises a through-hole (5) disposed in the transversal direction (T) and wherein the at least one second crossbeam (12) is configured to be coupled to or decoupled from the second transport frame (2) by means of the through-hole (5) disposed in a hollow profile (6) of the second transport frame (2).

The second transport frame (2) also comprises at least two support units (7) configured to be connected to corresponding housings (34) of the generator frame (33) of the nacelle frame (31). These housings (34) are configured to impede the transversal displacement of the second transport frame (2) once the second transport frame (2) is connected to the generator frame (33) of the nacelle frame (31).

Figures 6, 7:
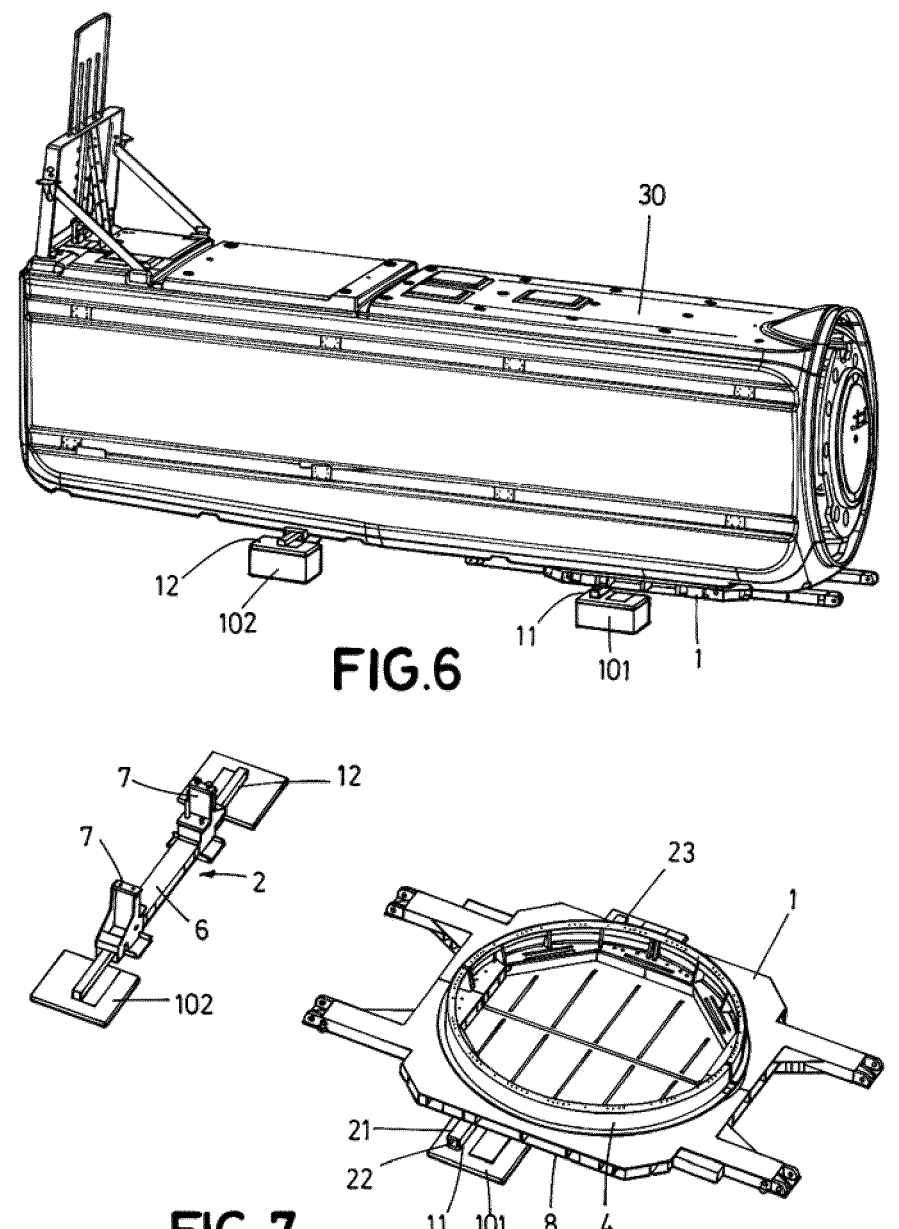
FIG. 6 shows a perspective view of the nacelle coupled to the first transport frame and the second transport frame of the system of the present invention according to a second preferred embodiment.
FIG. 7 shows a detail of the coupling of the at least one second crossbeam to the second transport frame and being disposed on the at least two second lateral supports on the left side and a detail of the supporting of the first transport frame by means of the at least one first crossbeam and being disposed on the at least two first lateral supports on the right side, wherein the at least one first crossbeam is positioned below the first transport frame.

In a second preferred embodiment shown in FIGS. 6 and 7, the first transport frame (1) comprises a lower surface (8) configured to be supported on the upper surface (21) of the at least one first crossbeam (11).

The first transport frame (1) comprises a connection flange (4) configured to be connected to the main support frame (32) of the nacelle frame (31).

Preferably, the system comprises two first crossbeams (11) (only one of them is shown in FIG. 7)

Preferably, the two first crossbeams (11) are disposed in a non-symmetrical way with regard to an axis of symmetry which passes by a centre of the first transport frame (1) in the transversal direction (T), as shown in FIG. 7.

In this second preferred embodiment, the second transport frame (2), shown in FIGS. 6 and 7 comprises a through-hole (5) disposed in the transversal direction (T) and wherein the at least one second crossbeam (12) is configured to be coupled to the second transport frame (2) by means of the through-hole (5) disposed in a hollow profile (6) of second transport frame (2).

The second transport frame (2) also comprises at least two support units (7) configured to be connected to corresponding housings (34) of the generator frame (33) of the nacelle frame (31) (not shown in FIG. 6). These housings (34) are configured to impede the transversal displacement of the second transport frame (2) once the second transport frame (2) is connected to the generator frame (33) of the nacelle frame (31).

For both the first and second preferred embodiments, the second transport frame (2) may optionally comprise two forklift pockets (9) disposed in the hollow profile (6) which go through the through-hole (5) of the second transport frame (2) in the longitudinal direction (L). The two forklift pockets (9) are configured to be engaged by a forklift in case the second transport frame (2) must be displaced.

Figures 2, 3, 4:
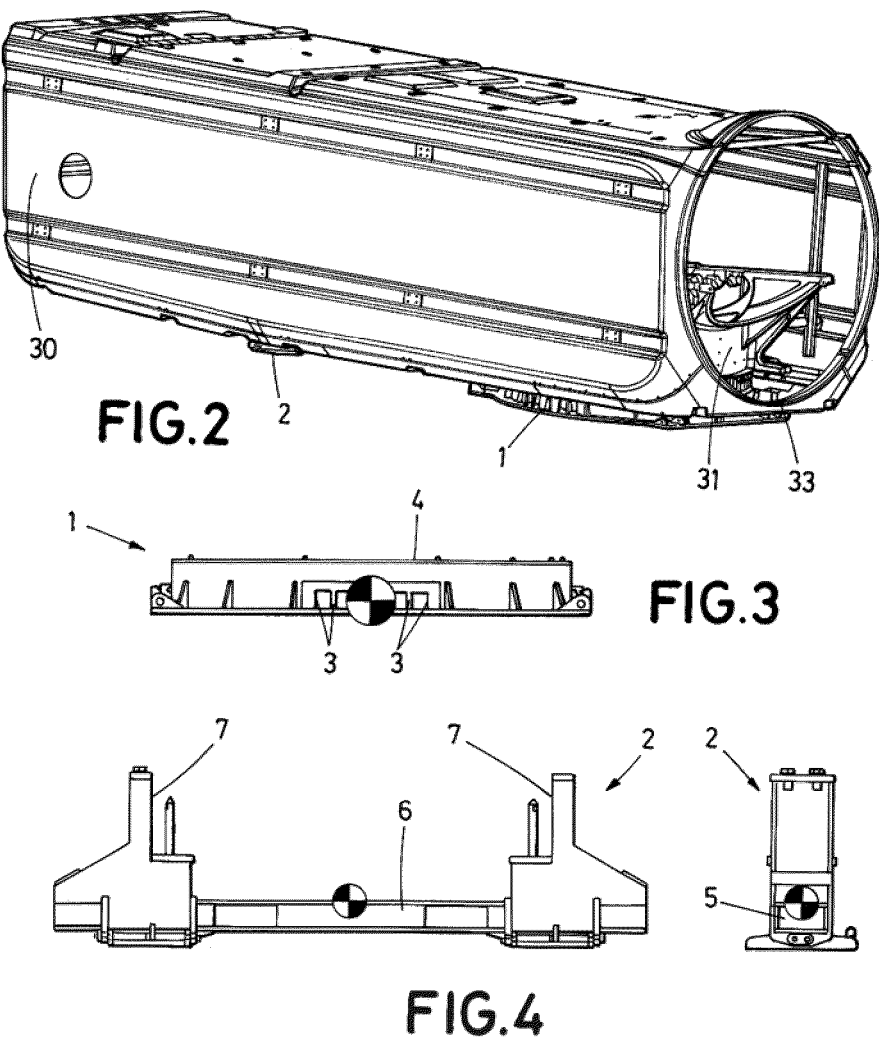
FIG. 2 shows a perspective view of a nacelle coupled to the first transport frame and the second transport frame of the system of the present invention according to the first preferred embodiment.
FIG. 3 shows a front view of the first transport frame according to the first preferred embodiment.
FIG. 4 shows a front view of the second transport frame according to the first preferred embodiment.
Figure 5:
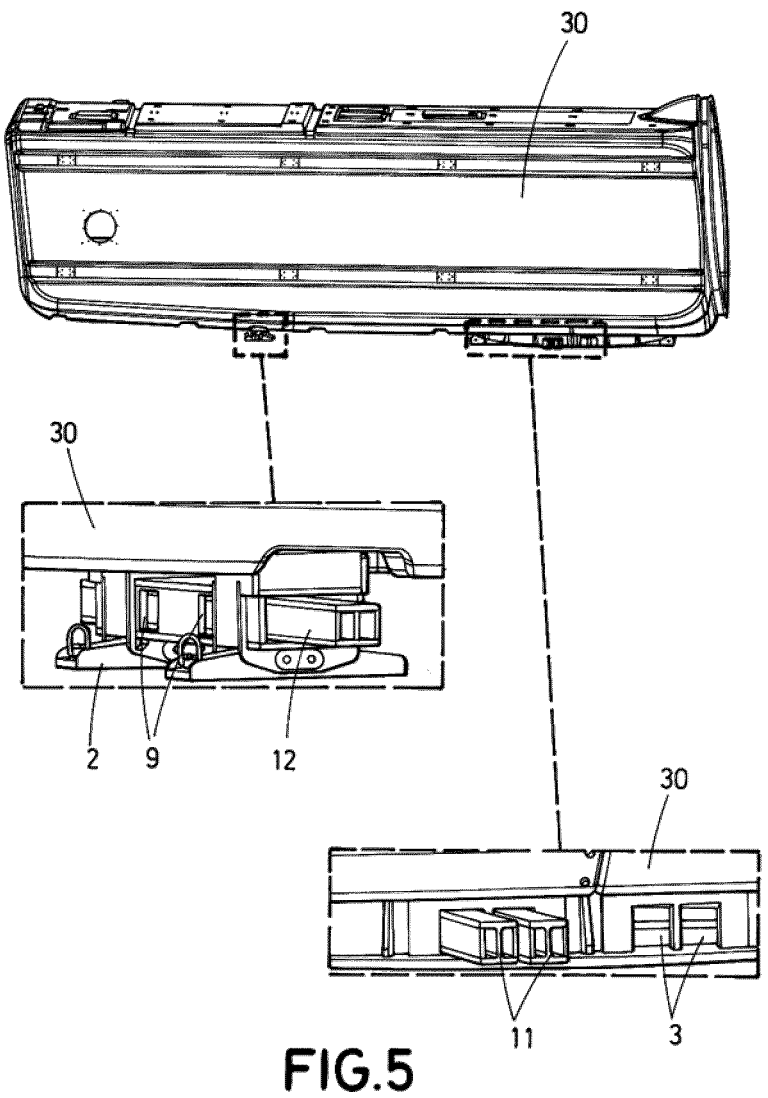
FIG. 5 shows a perspective view of the nacelle coupled to the first transport frame and the second transport frame of the system of the present invention according to the first preferred embodiment showing two details of the coupling of the at least one first crossbeam and the at least one second crossbeam to the first transport frame and the second transport frame respectively.

The number of first crossbeams (11) in the first and second preferred embodiments may vary. By example, FIGS. 3 and 5 show the first embodiment of the system of the invention wherein four first crossbeams (11) (only two of them represented in FIG. 5) are coupled to or disposed below the first transport frame (1)

Figures 23, 24:
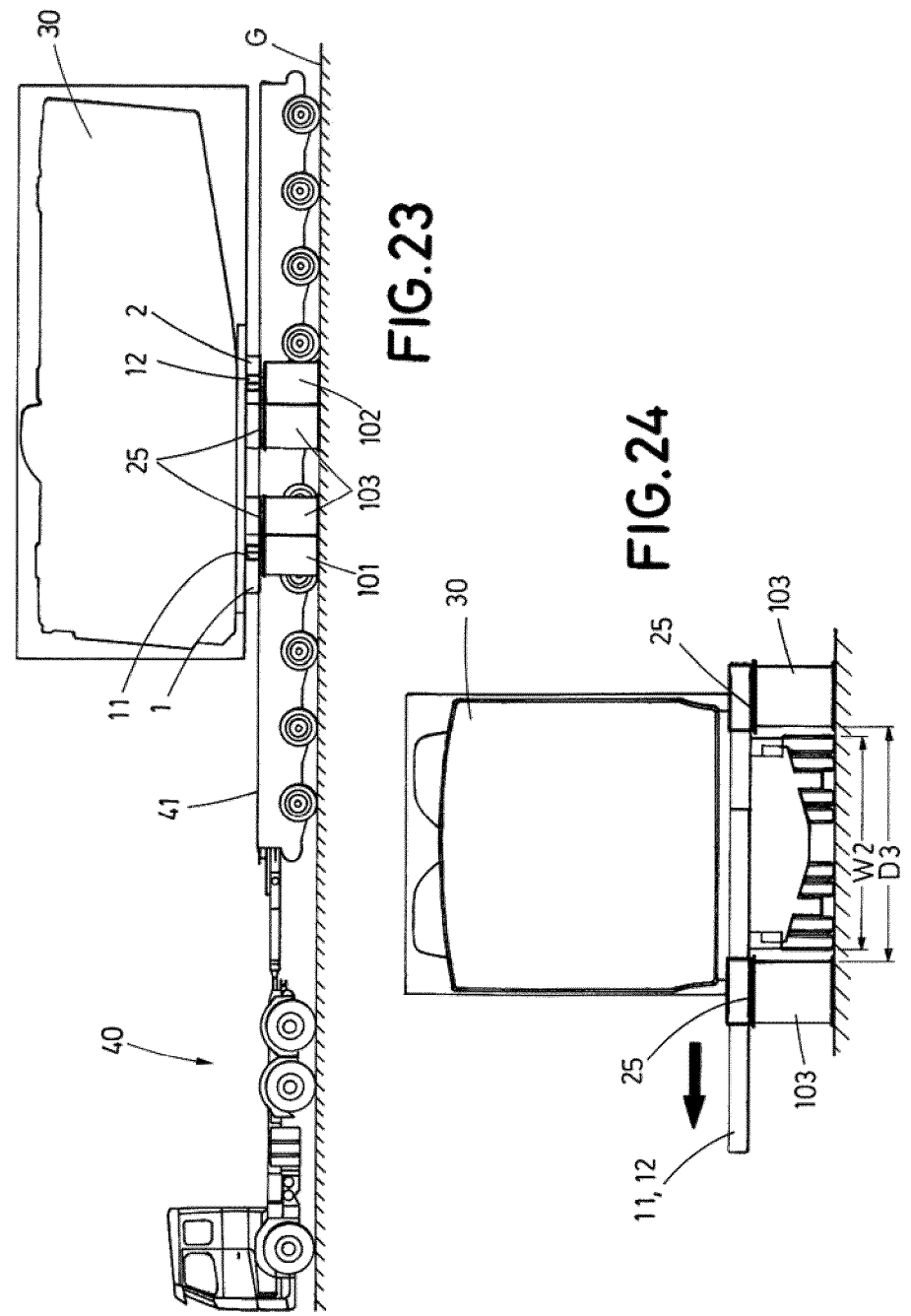
FIG. 23 shows the step of taking down the loading platform of the transportation means such that the first transport frame rests on the at least two third lateral supports, supporting the first transport frame and the nacelle after the step of positioning one third lateral support of the at least two third lateral supports on the ground at each side of the transportation means and under the first transport frame, of the method for loading a nacelle of a wind turbine on a transportation means carried out with the system comprising the at least two third lateral supports.
FIG. 24 shows the step of removing the at least one first crossbeam of the method for loading a nacelle of a wind turbine on a transportation means carried out with the system comprising the at least two third lateral supports.

Optionally, the system comprises at least two third lateral supports (103) configured to be disposed on the ground (G) separated by a third distance (D3) defined in the transversal direction (T) of the system, wherein the third distance (D3) is bigger than the second width (W2) of the transportation means (40) and smaller than the first length (L1) of the at least one first crossbeam (11), the at least two third lateral supports (103) also configured to support the first transport frame (1) and the nacelle (30) during at least a loading or unloading operation of the nacelle on the transportation means (40), such that the at least two third lateral supports (103) comprise an upper surface (25) disposed at a greater height than the upper surface (21) of the at least one first crossbeam (11) and optionally the at least one second crossbeam (12) when the lower surface (24) of the first end (22) and the second end (23) of the at least one first crossbeam (11) rests on the at least two first lateral supports (101) and optionally the at least one second crossbeam (12) rests on the at least two second lateral supports (102) respectively during at least a loading or unloading operation of the nacelle on the transportation means (40), as shown in FIGS. 23 to 26. When the nacelle (30) is to be loaded, the loading platform (41) of the transportation means (40), that may be in particular a truck or trailer, may be positioned beneath the nacelle (30) coupled to the first transport frame (1) and optionally to the second transport frame (2) to lift both the nacelle (30), the first transport frame (1), the at least one first crossbeam (11) and optionally the second transport frame (2) and the at least one second crossbeam (2). Once the at least two third lateral supports (103) are disposed on the ground (G) beneath the first transport frame (1) at both sides of the loading platform (41) in the transversal direction (T) as shown in FIG. 23, the loading platform (41) of the transportation means (40) may be taken down such that both the nacelle (30), the first transport frame (1) and optionally the second transport frame (2) rest on the at least two third lateral supports (103), making possible to release the at least one first crossbeam (11) and optionally the at least one second crossbeam (12).

Figures 25, 26:
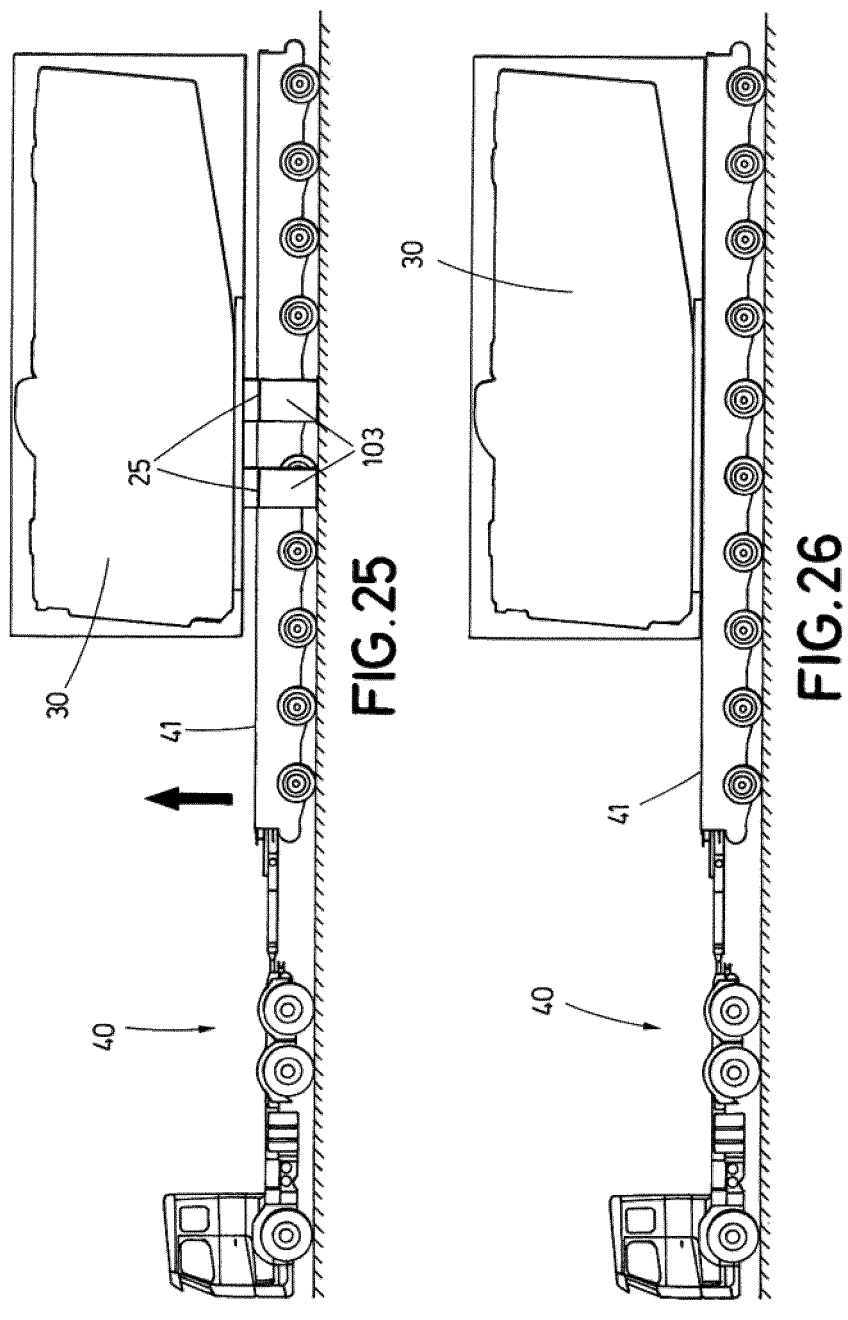
FIG. 25 shows the step of raising the loading platform of the transportation means of the method for loading a nacelle of a wind turbine on a transportation means carried out with the system comprising the at least two third lateral supports.
FIG. 26 shows the method for loading a nacelle of a wind turbine on a transportation means carried out with the system comprising the at least two third lateral supports when the first transport frame and the nacelle rest on the loading platform after the step of raising the loading platform of the transportation means.

In this way, the nacelle (30), the first transport frame (1) and optionally the second transport frame (2) may be lifted by the platform transform (41) of the transportation means (40) without any crossbeam (11, 12) protruding on the lateral sides of the transport platform (41) as shown in FIG. 26.

Preferably, the at least one first crossbeam (11) and/or the at least one second crossbeam (12) are made of steel.

Preferably, the first lateral supports (101) and/or the second lateral supports (102) and/or the third lateral supports (103) are made of steel, concrete or wood, optionally of stackable pieces of steel, concrete or wood.

Figures 8, 9, 10:
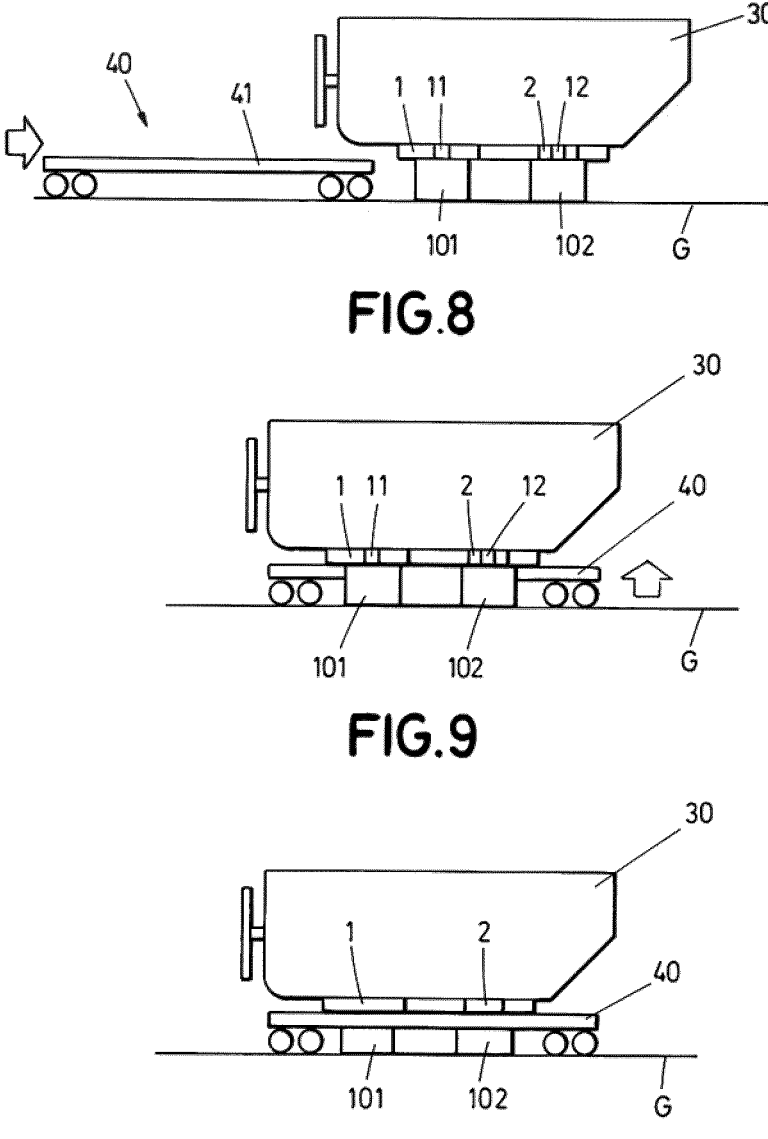
FIG. 8 shows a scheme view of the step of positioning the loading platform of the transportation means under the at least one first crossbeam of the method for loading a nacelle of a wind turbine on a transportation means of the present invention.
FIG. 9 shows a scheme view of the step of raising the loading platform of the transportation means of the method for loading a nacelle of a wind turbine on a transportation means of the present invention.
FIG. 10 shows a scheme view of the method for loading a nacelle of a wind turbine on a transportation means of the present invention once the step of raising the loading platform of the transportation means has been carried out.

The method for loading a nacelle (30) of a wind turbine on a transportation means (40) with the system described above is shown in FIGS. 8 to 11, wherein the method comprises the following steps:

a step of positioning the loading platform (41) of the transportation means (40) under the at least one first crossbeam (11), the at least one second crossbeam (12), the first transport frame (1), the second transport frame (2) and the nacelle (30), in between the at least two first lateral supports (101) and the at least two second lateral supports (201) wherein the lower surfaces (24, 29) of the first end (22, 27) and the second end (23, 28) of the at least one first crossbeam (11) and the at least one second crossbeam (12) are configured to rest (FIG. 8);

a step of raising the loading platform (40) of the transportation means such that the at least one first crossbeam (11) and the at least one second crossbeam (12) ceases to rest on the at least two first lateral supports (101) and the at least two second lateral supports (102) respectively, and the at least one first crossbeam (11), the at least one second crossbeam (12), the first transport frame (1), the second transport frame (2) and the nacelle (30) rest on the loading platform (40) (FIG. 9).

Figures 11, 12, 13:
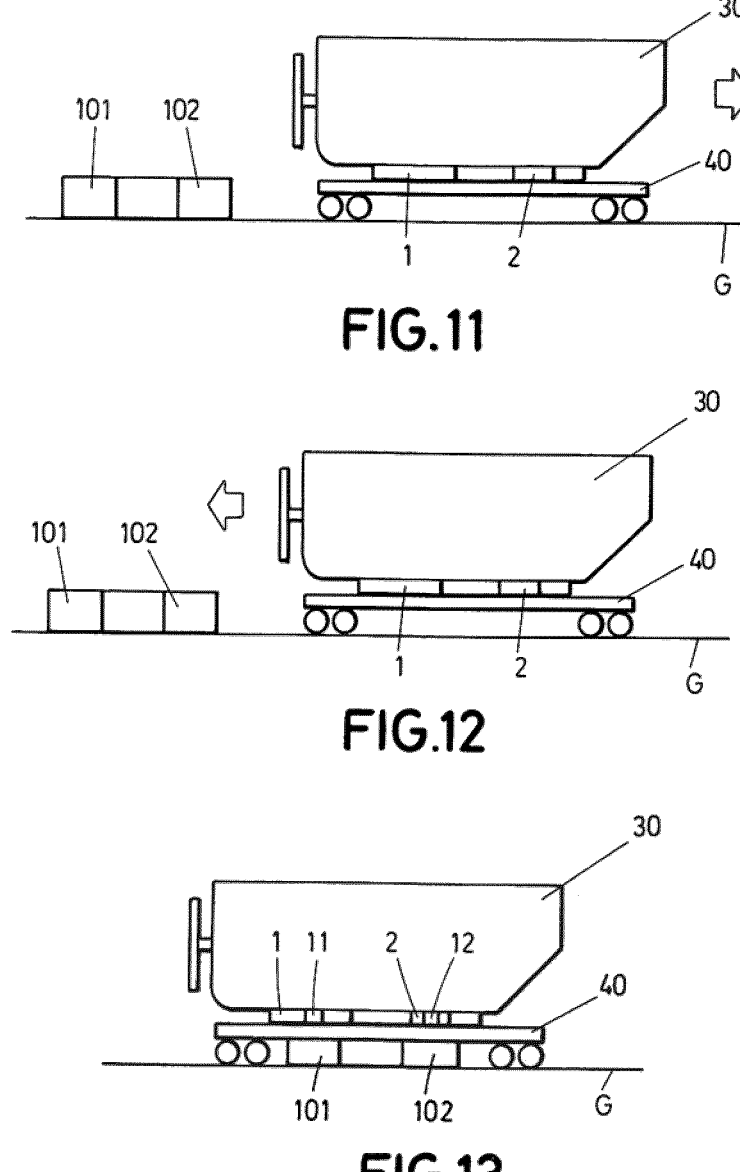
FIG. 11 shows a scheme view of the method for loading a nacelle of a wind turbine on a transportation means of the present invention with the transportation means already loading the nacelle.
FIG. 12 shows a scheme view of the step of positioning the loading platform of the transportation means carrying the at least one first crossbeam, the first transport frame and the nacelle, in between the at least two first lateral supports of the method for unloading a nacelle of a wind turbine from a transportation means of the present invention.
FIG. 13 shows a scheme view of the method for unloading a nacelle of a wind turbine from a transportation means of the present invention once the step of positioning the loading platform of the transportation means has been carried out.
Figure 14:
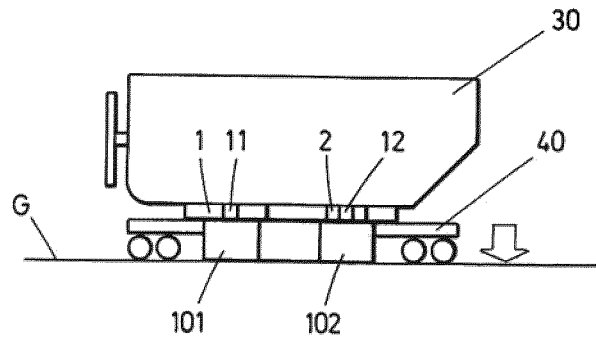
FIG. 14 shows a scheme view of the step of taking down the loading platform of the transportation means of the method for unloading a nacelle of a wind turbine from a transportation means of the present invention
Figure 15:
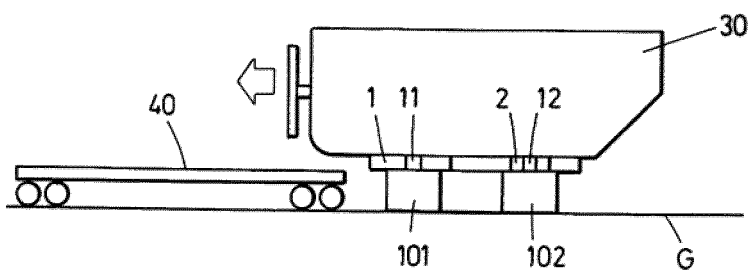
FIG. 15 shows a scheme view of the method for loading a nacelle of a wind turbine on a transportation means of the present invention when the step of taking down the loading platform has been carried out and the transportation means are displaced out of the position of the nacelle.
Figures 16, 17:
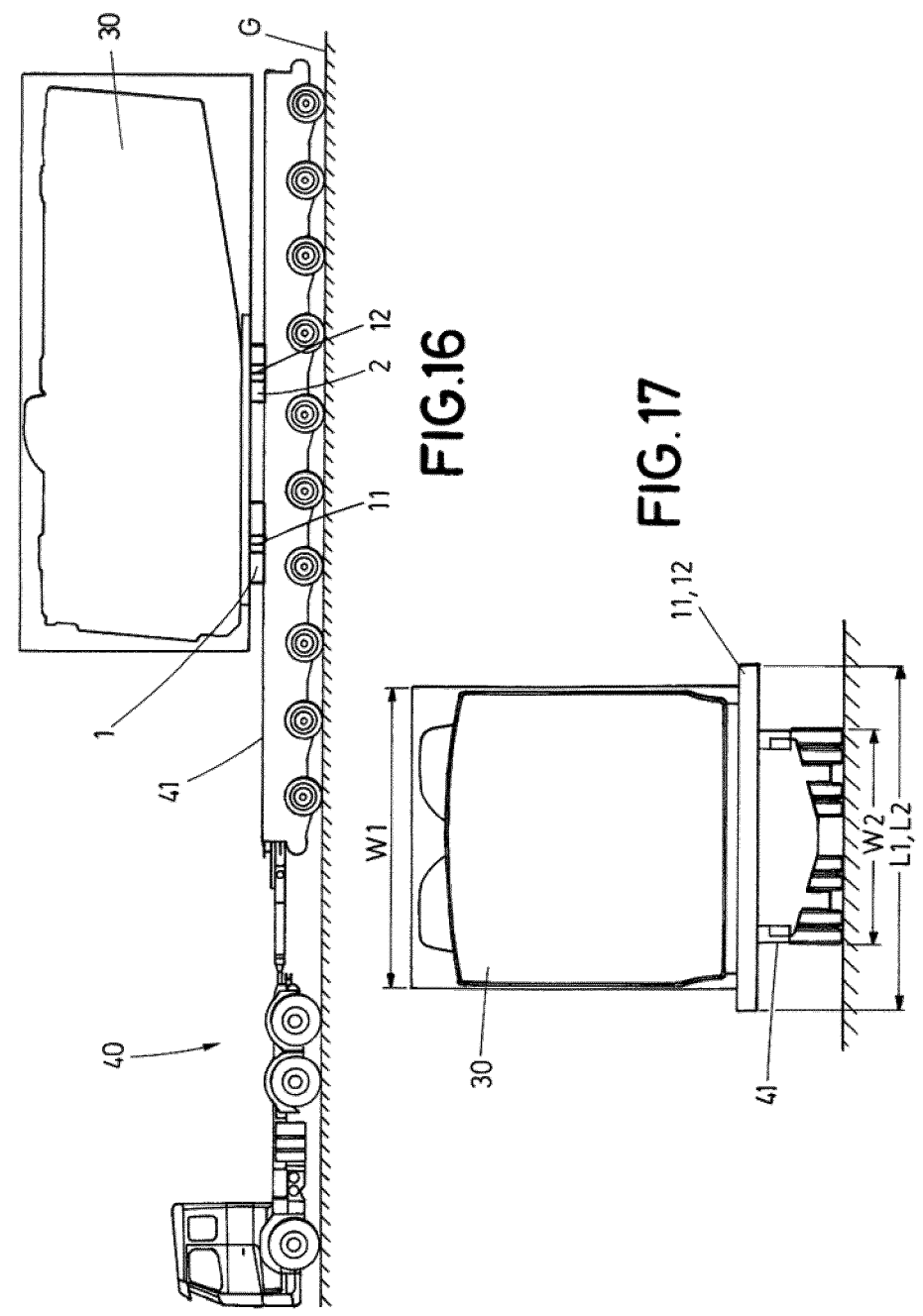
FIGS. 16 to 22 show the method of unloading a nacelle of a wind turbine from a transportation means carried out with the system of the present invention according to the second preferred embodiment.
Figures 18, 19:
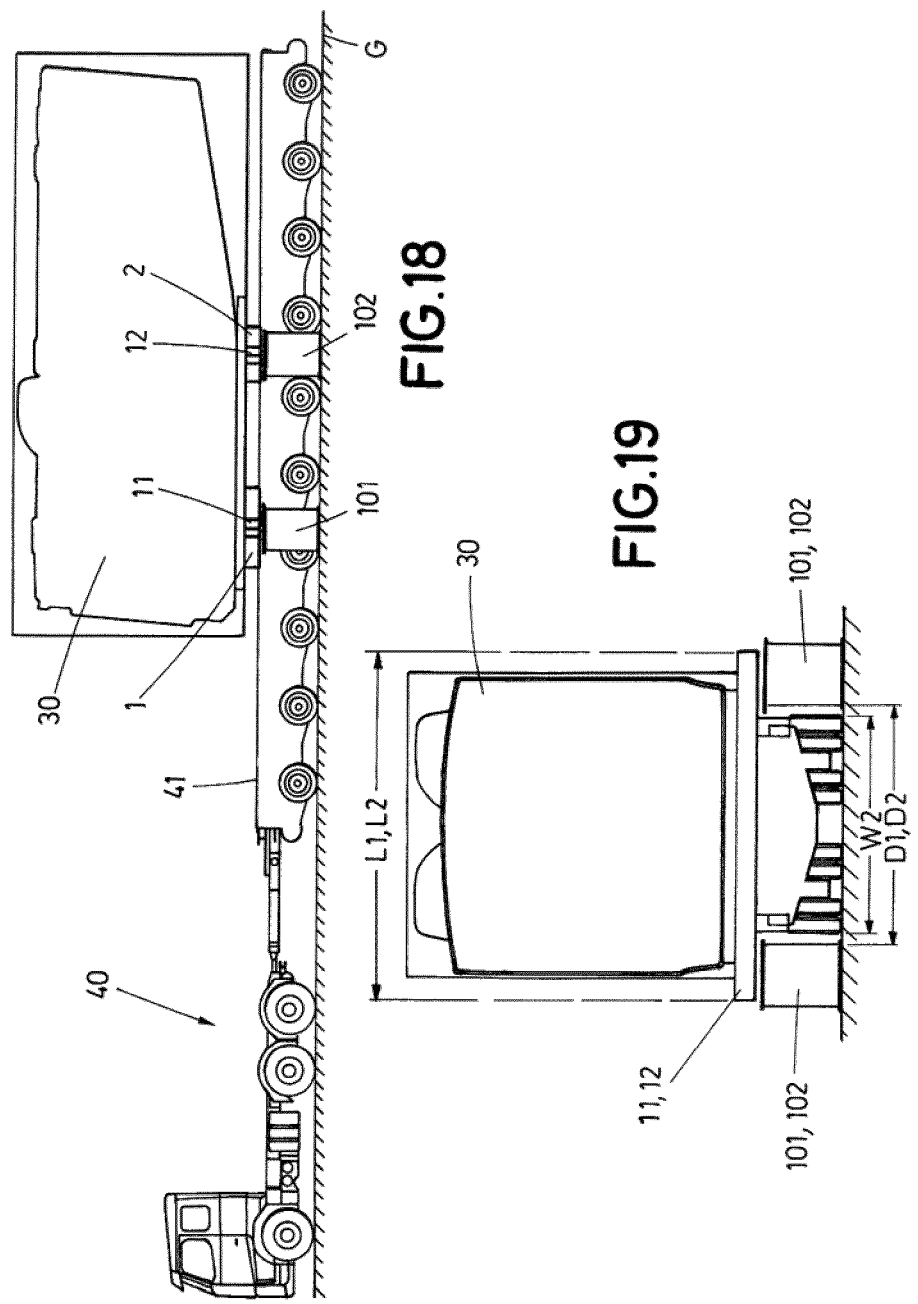
Figures 20, 21, 22:
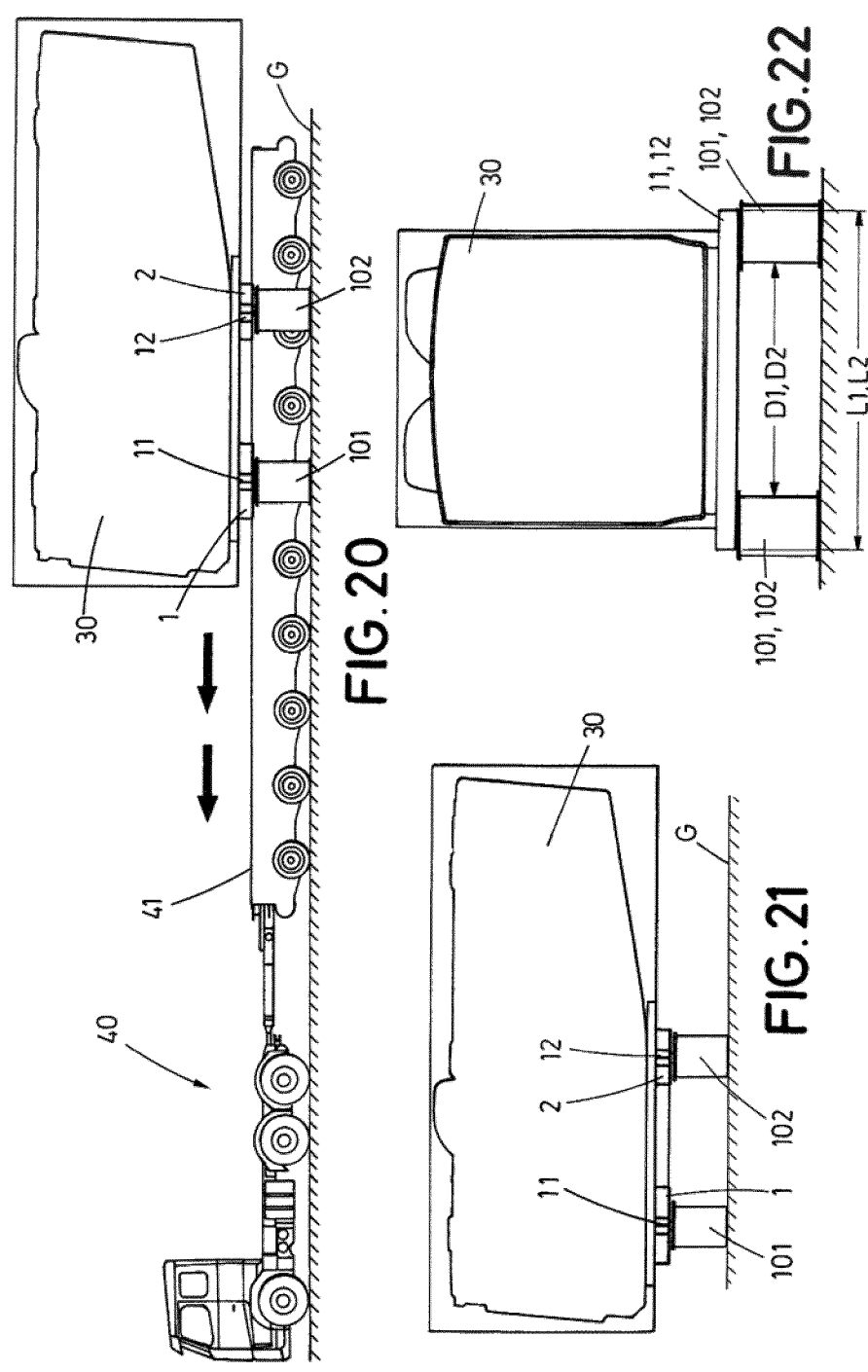

FIG. 10 shows the method for loading the nacelle (30) of a wind turbine on the transportation means (40) once the step of raising the loading platform of the transportation means has been carried out and FIG. 11 shows the method for loading the nacelle (30) of a wind turbine on the transportation means (40) with the transportation means (40) already loading the nacelle (30).

When the method for loading a nacelle of a wind turbine on a transportation means is carried out with the system described in the second preferred embodiment and with the at least two third lateral supports (103), it is possible to release the at least one first crossbeam (11) making that the first transport frame (1) rests on the at least two third lateral supports (103).

In this case, the method further comprises, after the step of raising the loading platform (40), the following steps:

a step of positioning the at least two third lateral supports (103) on the ground (G) beneath the first transport frame (1) at both sides of the loading platform (41) in the transversal direction (T) (FIG. 23);

a step of taking down the loading platform (41) of the transportation means (40) such that both the nacelle (30) and the first transport frame (1) rest on the at least two third lateral supports (103);

a step of removing the at least one first crossbeam (11) (FIG. 24); and a step of raising the loading platform (40) of the transportation means (FIG. 25) such that the first transport frame (1) and optionally the second transport frame (2) cease to rest on the at least two third lateral supports (103), and the first transport frame (1), the second transport frame (2) and the nacelle (30) rest on the loading platform (40) (FIG. 26).

The method for unloading a nacelle (30) of a wind turbine from a transportation means (40) with the system described above is shown in FIGS. 12 to 15, wherein the method comprises the following steps:

a step of positioning the loading platform (41) of the transportation means (40) carrying the at least one first crossbeam (11), the at least one second crossbeam (12), the first transport frame (1), the second transport frame (2) and the nacelle (30), in between the at least two first lateral supports (101) and the at least two second lateral supports (102); and a step of taking down the loading platform (40) of the transportation means (41) such that the lower surfaces (24, 29) of the first end (22, 27) and the second end (23, 28) of the at least one first crossbeam (11) and the at least one second crossbeam (12) rest on the at least two first lateral supports (101) and the at least two second lateral supports (102) respectively, supporting the at least one first crossbeam (11), the at least one second crossbeam (12), the first transport frame (1), the second transport frame (2) and the nacelle (30).

The invention claimed is:

1. A system for handling a nacelle of a wind turbine, the system comprising a longitudinal direction and a transversal direction;

wherein the nacelle comprises a nacelle frame being adapted to rest, by means of a first transport frame, on a transportation base;

wherein the nacelle frame comprises a first width defined in the transversal direction, a main support frame and a generator frame;

wherein the transportation base comprises a second width defined in the transversal direction and a loading platform; and wherein the system comprises:

the first transport frame configured to be connected to the main support frame of the nacelle frame and configured to rest on the transportation base;

at least one first crossbeam disposed in the transversal direction of the system and comprising:

a first length defined in the transversal direction of the system;

an upper surface, wherein the first transport frame is configured to be supported on the upper surface of the at least one first crossbeam during at least a loading or unloading operation of the nacelle on the transportation base;

a first end and a second end, each one of the first end and the second end comprising a lower surface;

wherein the first length of the at least one first crossbeam is bigger than the second width of the transportation base; and at least two first lateral supports configured to be disposed on a ground separated by a first distance defined in the transversal direction of the system, wherein the first distance is bigger than the second width of the transportation base and smaller than the first length of the at least one first crossbeam, the at least two first lateral supports also configured to support the at least one first crossbeam, the first transport frame and the nacelle, such that the lower surface of the first end and the second end of the at least one first crossbeam rests on the at least two first lateral supports during at least a loading or unloading operation of the nacelle on the transportation base.

2. The system of claim 1, wherein the first transport frame comprises at least two coupling openings disposed in opposite sides of the first transport frame in the transversal direction, and wherein the at least one first crossbeam is configured to be coupled to the first transport frame by means of using the at least two coupling openings.

3. The system of claim 2, wherein the first transport frame comprises a connection flange configured to be connected to the main support frame of the nacelle frame.

4. The system of claim 1 comprising at least two first crossbeams, wherein the at least two first crossbeams are disposed in a symmetrical way with regard to an axis of symmetry which passes by a center of the first transport frame in the transversal direction.

5. The system of claim 1 further comprising:

a second transport frame configured to be connected to the generator frame of the nacelle frame and configured to rest on the transportation base;

at least one second crossbeam disposed in the transversal direction and comprising:

a second length defined in the transversal direction of the system;

an upper surface, wherein the second transport frame is configured to be supported on the upper surface of the at least one second crossbeam during at least a loading or unloading operation of the nacelle on the transportation base;

a first end and a second end, each one of the first end and the second end comprising a lower surface;

wherein the second length of the at least one second crossbeam is bigger than the second width of the transportation base; and at least two second lateral supports configured to be disposed on the ground separated by a second distance defined in the transversal direction of the system, wherein the second distance is bigger than the second width of the transportation base and smaller than the second length of the at least one second crossbeam, the at least two first lateral supports also configured to support the at least one second crossbeam, the second transport frame and the nacelle, such that the lower surface of the first end and the second end of the at least one second crossbeam rests on the at least two second lateral supports during at least a loading or unloading operation of the nacelle on the transportation base.

6. The system of claim 5, wherein the second transport frame comprises a through-hole disposed in the transversal direction and wherein the at least one second crossbeam is configured to be coupled to the second transport frame using the through-hole.

7. The system of claim 5, wherein the second transport frame comprises at least two support units configured to be connected to the generator frame of the nacelle frame.

8. The system of claim 1 further comprising at least two third lateral supports configured to be disposed on the ground separated by a third distance defined in the transversal direction of the system, wherein the third distance is bigger than the second width of the transportation base and smaller than the first length of the at least one first crossbeam, the at least two third lateral supports also configured to support the first transport frame and the nacelle during at least a loading or unloading operation of the nacelle on the transportation base, such that the at least two third lateral supports comprise an upper surface disposed at a greater height than the upper surface of the at least one first crossbeam when the lower surface of the first end and the second end of the at least one first crossbeam rests on the at least two first lateral supports during at least a loading or unloading operation of the nacelle on the transportation base.

9. A method for loading a nacelle of a wind turbine on a transportation base, the method carried out with a system comprising for handling a nacelle of a wind turbine, the system comprising a longitudinal direction and a transversal direction;

wherein the nacelle comprises a nacelle frame being adapted to rest, using a first transport frame, on a transportation base;

wherein the nacelle frame comprises a first width defined in the transversal direction, a main support frame and a generator frame;

wherein the transportation base comprises a second width defined in the transversal direction and a loading platform; and wherein the system comprises:

the first transport frame configured to be connected to the main support frame of the nacelle frame and configured to rest on the transportation base;

at least one first crossbeam disposed in the transversal direction of the system and comprising:

a first length defined in the transversal direction of the system;

an upper surface, wherein the first transport frame is configured to be supported on the upper surface of the at least one first crossbeam during at least a loading or unloading operation of the nacelle on the transportation base;

a first end and a second end, each one of the first end and the second end comprising a lower surface;

wherein the first length of the at least one first crossbeam is bigger than the second width of the transportation base; and at least two first lateral supports configured to be disposed on a ground separated by a first distance defined in the transversal direction of the system, wherein the first distance is bigger than the second width of the transportation base and smaller than the first length of the at least one first crossbeam, the at least two first lateral supports also configured to support the at least one first crossbeam, the first transport frame and the nacelle, such that the lower surface of the first end and the second end of the at least one first crossbeam rests on the at least two first lateral supports during at least a loading or unloading operation of the nacelle on the transportation base; and wherein the method comprises the following steps:

a step of positioning the loading platform of the transportation base under the first transport frame, the nacelle and optionally under the at least one first crossbeam, in between the at least two first lateral supports wherein the lower surfaces of the first end and the second end of the at least one first crossbeam are configured to rest; and a step of raising the loading platform of the transportation base such that the at least one first crossbeam ceases to rest on the at least two first lateral supports, and the at least one first crossbeam, the first transport frame and the nacelle rest on the loading platform.

10. The method of claim 9 further comprising:

a step of coupling the at least one first crossbeam to the first transport frame using the at least two coupling openings of the first transport frame before the step of positioning the loading platform of the transportation base under the first transport frame and the nacelle and optionally under the at least one first crossbeam, in between the at least two first lateral supports.

11. The method of claim 9 further comprising:

a step of connecting the connection flange of the first transport frame to the main support frame of the nacelle frame.

12. The method of claim 9 carried out with a system for handling a nacelle of a wind turbine, the system comprising a longitudinal direction and a transversal direction;

wherein the nacelle comprises a nacelle frame being adapted to rest, using a first transport frame, on a transportation base;

wherein the nacelle frame comprises a first width defined in the transversal direction, a main support frame and a generator frame;

wherein the transportation base comprises a second width defined in the transversal direction and a loading platform; and wherein the system comprises:

the first transport frame configured to be connected to the main support frame of the nacelle frame and configured to rest on the transportation base;

at least one first crossbeam disposed in the transversal direction of the system and comprising:

a first length defined in the transversal direction of the system;

an upper surface, wherein the first transport frame is configured to be supported on the upper surface of the at least one first crossbeam during at least a loading or unloading operation of the nacelle on the transportation base;

a first end and a second end, each one of the first end and the second end comprising a lower surface;

wherein the first length of the at least one first crossbeam is bigger than the second width of the transportation base; and at least two first lateral supports configured to be disposed on a ground separated by a first distance defined in the transversal direction of the system, wherein the first distance is bigger than the second width of the transportation base and smaller than the first length of the at least one first crossbeam, the at least two first lateral supports also configured to support the at least one first crossbeam, the first transport frame and the nacelle, such that the lower surface of the first end and the second end of the at least one first crossbeam rests on the at least two first lateral supports during at least a loading or unloading operation of the nacelle on the transportation base;

a second transport frame configured to be connected to the generator frame of the nacelle frame and configured to rest on the transportation base;

at least one second crossbeam disposed in the transversal direction and comprising:

a second length defined in the transversal direction of the system;

an upper surface, wherein the second transport frame is configured to be supported on the upper surface of the at least one second crossbeam during at least a loading or unloading operation of the nacelle on the transportation base;

a first end and a second end, each one of the first end and the second end comprising a lower surface;

wherein the second length of the at least one second crossbeam is bigger than the second width of the transportation base; and at least two second lateral supports configured to be disposed on the ground separated by a second distance defined in the transversal direction of the system, wherein the second distance is bigger than the second width of the transportation base and smaller than the second length of the at least one second crossbeam, the at least two first lateral supports also configured to support the at least one second crossbeam, the second transport frame and the nacelle, such that the lower surface of the first end and the second end of the at least one second crossbeam rests on the at least two second lateral supports during at least a loading or unloading operation of the nacelle on the transportation base; and the method further comprising:

a step of positioning the loading platform of the transportation base under the second transport frame and the nacelle and optionally under the at least one second crossbeam, in between the at least two second lateral supports wherein the lower surfaces of the first end and the second end of the at least one second crossbeam are configured to rest;

such that in the step of raising the loading platform of the transportation base, the at least one second crossbeam also ceases to rest on the at least two second lateral supports, and the at least one second crossbeam, the second transport frame and the nacelle rest on the loading platform.

13. The method of claim 9 carried out with a system for handling a nacelle of a wind turbine, the system comprising a longitudinal direction and a transversal direction;

wherein the nacelle comprises a nacelle frame being adapted to rest, using a first transport frame, on a transportation base;

wherein the nacelle frame comprises a first width defined in the transversal direction, a main support frame and a generator frame;

wherein the transportation base comprises a second width defined in the transversal direction and a loading platform; and wherein the system comprises:

the first transport frame configured to be connected to the main support frame of the nacelle frame and configured to rest on the transportation base;

at least one first crossbeam disposed in the transversal direction of the system and comprising:

a first length defined in the transversal direction of the system;

an upper surface, wherein the first transport frame is configured to be supported on the upper surface of the at least one first crossbeam during at least a loading or unloading operation of the nacelle on the transportation base;

a first end and a second end, each one of the first end and the second end comprising a lower surface;

wherein the first length of the at least one first crossbeam is bigger than the second width of the transportation base; and at least two first lateral supports configured to be disposed on a ground separated by a first distance defined in the transversal direction of the system, wherein the first distance is bigger than the second width of the transportation base and smaller than the first length of the at least one first crossbeam, the at least two first lateral supports also configured to support the at least one first crossbeam, the first transport frame and the nacelle, such that the lower surface of the first end and the second end of the at least one first crossbeam rests on the at least two first lateral supports during at least a loading or unloading operation of the nacelle on the transportation base;

at least two third lateral supports configured to be disposed on the ground separated by a third distance defined in the transversal direction of the system, wherein the third distance is bigger than the second width of the transportation base and smaller than the first length of the at least one first crossbeam, the at least two third lateral supports also configured to support the first transport frame and the nacelle during at least a loading or unloading operation of the nacelle on the transportation base, such that the at least two third lateral supports comprise an upper surface disposed at a greater height than the upper surface of the at least one first crossbeam when the lower surface of the first end and the second end of the at least one first crossbeam rests on the at least two first lateral supports during at least a loading or unloading operation of the nacelle on the transportation base; and the method further comprising:

a step of positioning one third lateral support of the at least two third lateral supports on the ground at each side of the transportation base and under the first transport frame;

a step of taking down the loading platform of the transportation base such that the first transport frame rests on the at least two third lateral supports, supporting the first transport frame and the nacelle;

a step of removing the at least one first crossbeam; and a step of raising the loading platform of the transportation base such that the first transport frame ceases to rest on the at least two third lateral supports, and the first transport frame and the nacelle rest on the loading platform.

14. A method for unloading a nacelle of a wind turbine from a transportation base, the method carried out with a system for handling a nacelle of a wind turbine, the system comprising a longitudinal direction and a transversal direction;

wherein the nacelle comprises a nacelle frame being adapted to rest, using a first transport frame, on a transportation base;

wherein the nacelle frame comprises a first width defined in the transversal direction, a main support frame and a generator frame;

wherein the transportation base comprises a second width defined in the transversal direction and a loading platform; and wherein the system comprises:

the first transport frame configured to be connected to the main support frame of the nacelle frame and configured to rest on the transportation base;

at least one first crossbeam disposed in the transversal direction of the system and comprising:

a first length defined in the transversal direction of the system;

an upper surface, wherein the first transport frame is configured to be supported on the upper surface of the at least one first crossbeam during at least a loading or unloading operation of the nacelle on the transportation base;

oa first end and a second end, each one of the first end and the second end comprising a lower surface;

wherein the first length of the at least one first crossbeam is bigger than the second width of the transportation base; and at least two first lateral supports configured to be disposed on a ground separated by a first distance defined in the transversal direction of the system, wherein the first distance is bigger than the second width of the transportation base and smaller than the first length of the at least one first crossbeam, the at least two first lateral supports also configured to support the at least one first crossbeam, the first transport frame and the nacelle, such that the lower surface of the first end and the second end of the at least one first crossbeam rests on the at least two first lateral supports during at least a loading or unloading operation of the nacelle on the transportation base, and wherein the method comprises the following steps:

a step of positioning the loading platform of the transportation base carrying the first transport frame and the nacelle and optionally the at least one first crossbeam, in between the at least two first lateral supports; and a step of taking down the loading platform of the transportation base such that the lower surface of the first end and the second end of the at least one first crossbeam rests on the at least two first lateral supports, supporting the at least one first crossbeam, the first transport frame and the nacelle.

15. The method of claim 14 carried out with a system for handling a nacelle of a wind turbine, the system comprising a longitudinal direction and a transversal direction;

wherein the nacelle comprises a nacelle frame being adapted to rest, using a first transport frame, on a transportation base;

wherein the nacelle frame comprises a first width defined in the transversal direction, a main support frame and a generator frame;

wherein the transportation base comprises a second width defined in the transversal direction and a loading platform; and wherein the system comprises:

the first transport frame configured to be connected to the main support frame of the nacelle frame and configured to rest on the transportation base;

at least one first crossbeam disposed in the transversal direction of the system and comprising:

a first length defined in the transversal direction of the system;

an upper surface, wherein the first transport frame is configured to be supported on the upper surface of the at least one first crossbeam during at least a loading or unloading operation of the nacelle on the transportation base;

a first end and a second end, each one of the first end and the second end comprising a lower surface;

wherein the first length of the at least one first crossbeam is bigger than the second width of the transportation base; and at least two first lateral supports configured to be disposed on a ground separated by a first distance defined in the transversal direction of the system, wherein the first distance is bigger than the second width of the transportation base and smaller than the first length of the at least one first crossbeam, the at least two first lateral supports also configured to support the at least one first crossbeam, the first transport frame and the nacelle, such that the lower surface of the first end and the second end of the at least one first crossbeam rests on the at least two first lateral supports during at least a loading or unloading operation of the nacelle on the transportation base;

a second transport frame configured to be connected to the generator frame of the nacelle frame and configured to rest on the transportation base;

at least one second crossbeam disposed in the transversal direction and comprising:

a second length defined in the transversal direction of the system;

an upper surface, wherein the second transport frame is configured to be supported on the upper surface of the at least one second crossbeam during at least a loading or unloading operation of the nacelle on the transportation base;

a first end and a second end, each one of the first end and the second end comprising a lower surface;

wherein the second length of the at least one second crossbeam is bigger than the second width of the transportation base; and at least two second lateral supports configured to be disposed on the ground separated by a second distance defined in the transversal direction of the system, wherein the second distance is bigger than the second width of the transportation base and smaller than the second length of the at least one second crossbeam, the at least two first lateral supports also configured to support the at least one second crossbeam, the second transport frame and the nacelle, such that the lower surface of the first end and the second end of the at least one second crossbeam rests on the at least two second lateral supports during at least a loading or unloading operation of the nacelle on the transportation base; and wherein the method:

in the step of positioning the loading platform of the transportation base carrying the first transport frame and the nacelle and optionally the at least one first crossbeam, in between the at least two first lateral supports, the at least one second crossbeam and the second transport frame are also disposed on the loading platform; and in the step of taking down the loading platform of the transportation base, the lower surface of the first end and the second end of the at least one second crossbeam rests on the at least two second lateral supports, supporting the at least one second crossbeam, the second transport frame and the nacelle.

* * * * *